Sept. 15, 1959     F. L. ALCUS     2,903,861
SYSTEM AND APPARATUS FOR DRYING AIR
Filed Sept. 23, 1957     2 Sheets-Sheet 1

INVENTOR
FELIX L. ALCUS
BY
ATTORNEYS

Sept. 15, 1959  F. L. ALCUS  2,903,861
SYSTEM AND APPARATUS FOR DRYING AIR
Filed Sept. 23, 1957  2 Sheets-Sheet 2
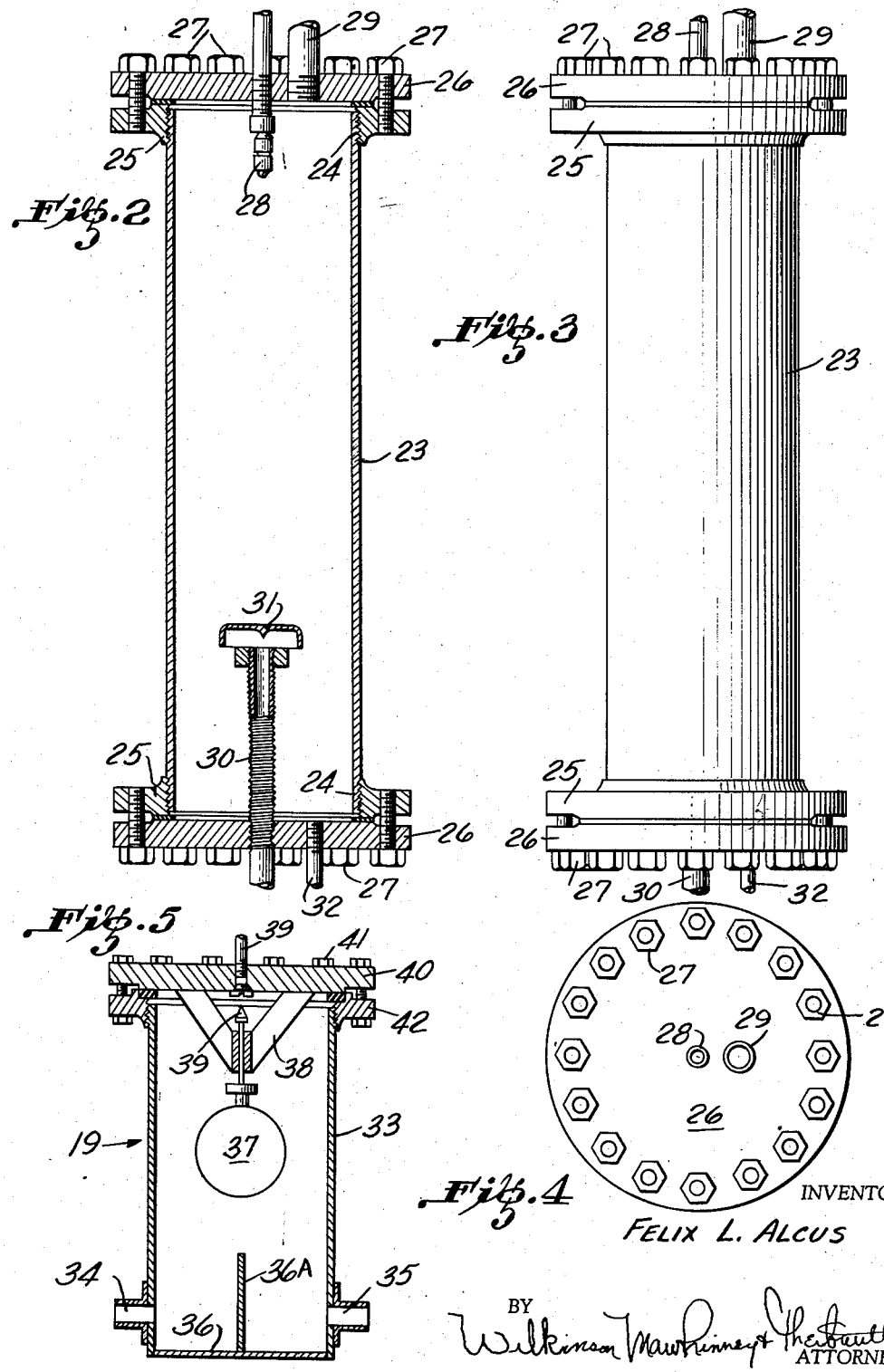
INVENTOR
FELIX L. ALCUS
BY Wilkinson Mawhinney & Theibault
ATTORNEY United States Patent Office 2,903,861
Patented Sept. 15, 1959

2,903,861
SYSTEM AND APPARATUS FOR DRYING AIR

Felix L. Alcus, New Orleans, La.

Application September 23, 1957, Serial No. 685,547

11 Claims. (Cl. 62—93)

The present invention relates to system and apparatus for drying air.

Numerous attempts have been made to overcome the several weaknesses in the systems now in use for drying instrument air. Such air must be dry enough to allow its use at ambient temperatures as much below freezing as are likely to be encountered. No corrosive or toxic substances may be allowed to contaminate the air and there should be no possibility of the introduction of solids.

Most of the equipment now in use employ desiccants which break down and enter the air stream as fine dust. Such a system necessitates the use of a changeover cycle, which often fails. Equipment now in use which does not employ desiccants either fails to dry the air sufficiently or can allow corrosive or toxic substances to mix with it.

It is an object of the present invention to overcome the foregoing difficulties and to provide a system continuous in its action demanding little attention. While the instant system is described employing methylene chloride as the moisture condensing and freezing medium other substances may be employed which have similar physical characteristics to methylene chloride.

With the foregoing and other objects in view, the invention will be more fully described hereinafter, and will be more particularly pointed out in the claims appended hereto.

In the drawings, wherein like symbols refer to like or corresponding parts throughout the several views:

Figure 2 is a vertical section through a spray chamber constructed in accordance with the present invention.

Figure 3 is a side elevational view of the spray chamber of Figure 2.

Figure 4 is a top plan view of the spray chamber of Figure 3.

Figure 5 is a vertical section of a float trap employed with the present invention.

Figure 1:
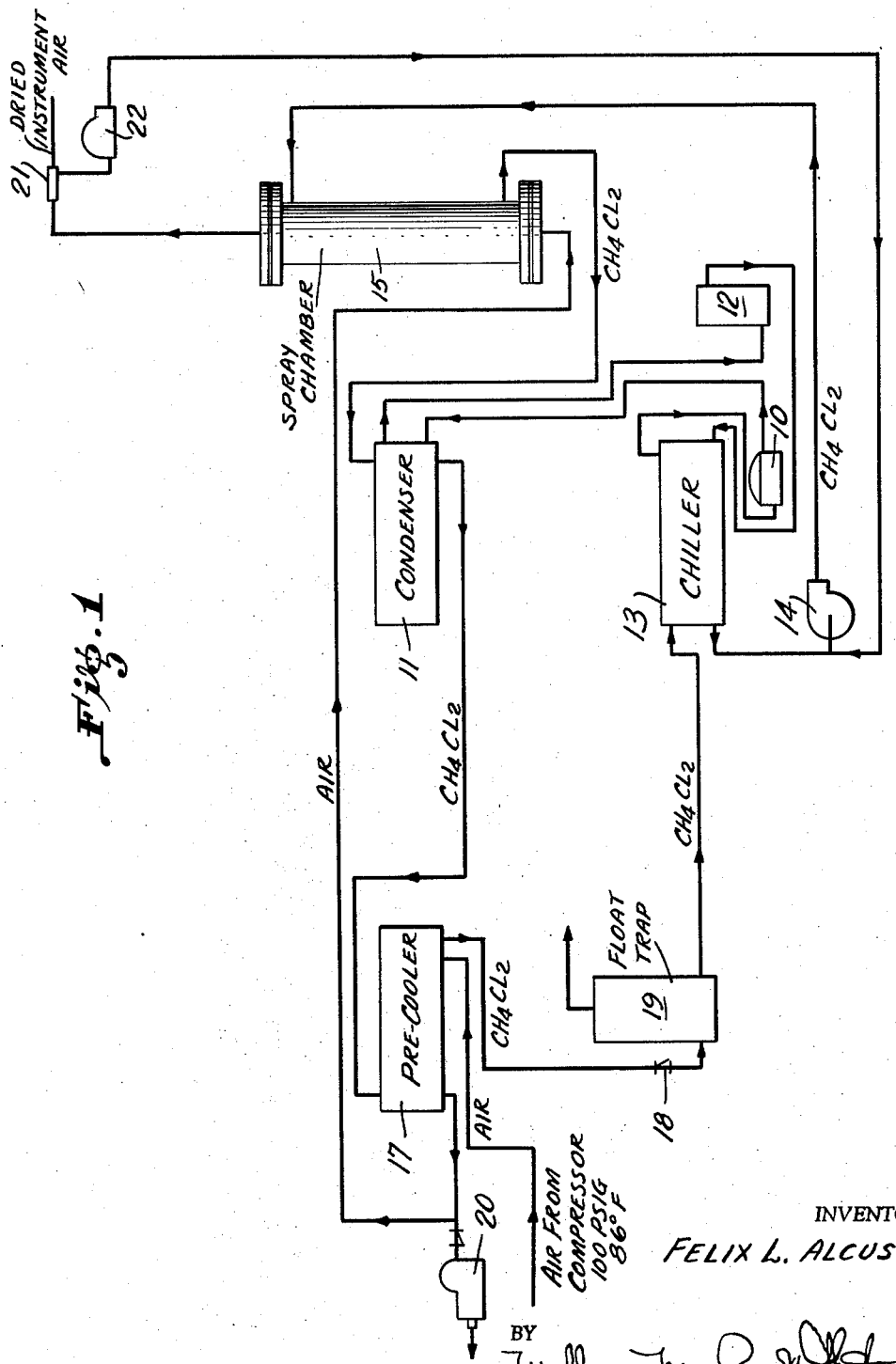
Figure 1 is a schematic layout of one form of apparatus for drying air in accordance with the present invention.

Referring more particularly to Figure 1 the system will be described from which it will be noted that a primary refrigeration circuit comprises a compressor 10 operating with a suction temperature of −18° F. and which is in fluid circuit with a condenser 11, a receiver 12 and a chiller 13. This is a closed cycle F22 system.

The air moisture condensing and freezing medium or secondary refrigeration system originates with the chiller 13, passes through a circulating pump 14 where the pressure of the secondary refrigerant is built up to 130 p.s.i.g. and fed into a spray chamber 15. The secondary refrigerant leaves the spray chamber and passes through the concentric tube condenser 11 which is in heat exchange relationship with the primary refrigeration circuit described above. The temperature of the secondary refrigerant is raised from 15° F. to 30° F. after passing through the condenser 11. The refrigerant then passes through a concentric tube precooler 17, through a strainer 18 and a float trap 19 thence through the chiller and the cycle is repeated. The temperature of the secondary refrigerant upstream of the precooler 17 is 30° F. and downstream of the cooler 17 it is 40° F. The temperature of the refrigerant upstream of the chiller 13 is 40° F. whereas it is −10° F. downstream of the chiller.

The air to be used is first compressed to 100 p.s.i.g. at 86° F. minimum and then passed through the precooler 17 and thence introduced into the spray chamber 15. The compressed air at 86° F. when passed through the precooler 17 in which heat is exchanged raises the temperature of the secondary refrigerant to 40° F. causing ice crystals in it to melt and the float trap 19 in which the ice, now melted and any entrained air or gases are separated and discharged.

In the system illustrated 333 pounds of air per hour are cooled and 5.35 pounds of moisture removed. With such a proportion of water to air and with approximately 36 pounds of secondary refrigerant circulating there is no danger of clogging the system with ice.

A float trap 20 removes entrained moisture from the air before it enters the spray chamber 15. Any of the secondary refrigerant which might be entrained in the air leaving the spray chamber is removed by a centrifugal purifier 21 and float trap 22 and returned to the suction side of the circulating pump 14.

In the illustration methylene chloride is used as a moisture condensing and freezing medium or secondary refrigerant although any suitable substance may be substituted. Methylene chloride has a freezing point of −97° F. and it is reasonable to assume that the dew point of the air in a system using it could be brought to −90° F. which is much lower than any usual requirements. It is a very stable substance and will not break down readily. Its specific gravity at 25° C. is 1.320 and it will separate easily from air at 100 p.s.i.g. weighing 0.5 #/cu. ft. It will absorb a maximum of 0.01% of water and can be easily separated from it. It is non toxic and non volatile at the pressures used and its maximum acidity in the form of HCl is 0.0005%. It boils at 39.8° C. under a pressure of 760 mm. Hg. Since, in my device, the secondary refrigerant will never be under a pressure of less than 90 p.s.i.g. and a temperature of more than 40° F. it will be liquid at all times.

Referring now to Figures 2, 3 and 4 the construction of the spray chamber 15 will be generally described. The chamber consists of a cylinder 23 having threaded ends 24 over which are received anchor flanges 25 and to which are bolted end plates 26 by bolts 27. The upper end plate receives a spray line and nozzle 28 for introducing the chilled methylene chloride as a secondary refrigerant and has another line 29 to permit the instrument air to leave the chamber. The bottom plate 26 has an introduction nozzle or air inlet pipe 30 with a diffuser cap 31 for receiving the precooled compressed air. A refrigerant drain tube 32 is also provided for supplying the refrigerant to the closed secondary refrigerant system.

Referring now to Figure 5 a float trap 19 is illustrated as comprising a cylinder 33 having an inlet opening 34 and a discharge opening 35 diametrically disposed therefrom. A bottom 36 is secured to the cylinder and has a baffle plate 36A thereon to remove the openings 34, 35 from direct sight of one another. A float ball 37 is suspended from a spider 38 and is positioned to seat a valve 39 connected to the float 38 to close the fluid line 39. A top 40 is bolted at 41 to an anchor flange 42 threadedly received on the upper end of the cylinder 33.

Although I have disclosed herein the best form of the invention known to me at this time, I reserve the right to all such modifications and changes as may come within the scope of the following claims.

What I claim is:

1. The method for drying air for use in instruments consisting of compressing air, precooling the compressed air by passing it into heat exchange relation with a secondary refrigerant, cooling said secondary refrigerant to a temperature substantially below that of the precooled compressed air, combining the cooled secondary refrigerant with the precooled compressed air, and removing the secondary refrigerant and moisture absorbed thereby from the air prior to use.

2. The method of claim 1 wherein the secondary refrigerant is methylene chloride.

3. The method for drying air as claimed in claim 1 wherein the secondary refrigerant is methylene chloride.

4. An apparatus for drying air for use in instruments comprising a closed cycle secondary refrigerant system, a closed cycle refrigeration system for cooling said secondary refrigerant system and in heat exchange relationship therewith, a spray chamber in fluid circuit with said secondary refrigerant system, a source of compressed air, said secondary refrigerant system including a precooler in communication with the source of compressed air for precooling said compressed air, said precooled compressed air being in communication with said spray chamber, and a centrifugal purifier in fluid communication with the air leaving said spray chamber to assure removal of all the secondary refrigerant from the air.

5. An apparatus for drying air for use in instruments comprising a spray chamber, a secondary refrigerant system for introducing a secondary refrigerant into said spray chamber at a temperature below 0° F. and at a pressure in excess of 100 p.s.i.g., a closed cycle primary refrigerator circuit in heat exchange relation with the secondary refrigerant system for maintaining the cooled temperatures of the secondary refrigerant, means for introducing air under pressure into said spray chamber, a precooler in fluid circuit with the secondary refrigerant discharged from said spray chamber and in heat exchange with air supplied to said spray chamber to raise the temperature of said secondary refrigerant causing ice crystals in said secondary refrigerant to melt, and a float trap in fluid circuit with said secondary refrigerant down stream of said precooler for separating entrained air and gases from said secondary refrigerant and discharging them.

6. An apparatus for drying air as claimed in claim 5 further comprising a circulating pump in fluid circuit with said secondary refrigerant upstream of said spray chamber to maintain secondary refrigerant pressure of the order of 130 p.s.i.g. at the spray chamber whereby moisture in the air coming in contact with said secondary refrigerant will freeze and be separated therefrom.

7. An apparatus as claimed in claim 4 wherein said spray chamber comprises a cylindrical container closed at each end, means at the bottom of said container for introducing the compressed air, means at the top of the container for introducing the chilled secondary refrigerant, and means adjacent said last named means in the top of said container to permit removal of the dried air from said spray chamber.

8. In a method of drying air for use in instruments comprising the step of compressing said air, precooling said air by passing it into heat exchange relation with a secondary refrigerant, cooling said secondary refrigerant to a temperature below 0° F. by passing it into heat exchange relation with a primary refrigeration system, passing the cooled air into a spray chamber into contact with the cooled secondary refrigerant whereby moisture in the air is removed by freezing, removing the dried air from said spray chamber and subjecting the moisture free air to centrifugal purification.

9. In a method of drying air for use in instruments, comprising the steps of compressing said air to a pressure in the order of 100 p.s.i.g. at a temperature in the order of 86° F., passing said compressed air through a precooler for initially decreasing the temperature thereof, passing the cooled compressed air into a spray chamber and into contact with a chilled secondary refrigerant, whereby moisture in the air is removed by freezing, removing the dried air from said spray chamber and subjecting the moisture free air to centrifugal purification.

10. In a method of drying air for use in instruments, comprising the steps of compressing said air to a pressure in the order of 100 p.s.i.g. at a temperature in the order of 86° F., precooling said air by passing it into heat exchange relation with a secondary refrigerant, cooling said secondary refrigerant to a temperature below 0° F. by passing it into heat exchange relation with a primary refrigeration system, passing the cooled compressed air into a spray chamber and into contact with the cooled secondary refrigerant whereby moisture in the air is removed by freezing, removing the dried air from said spray chamber, and subjecting the moisture free air to centrifugal purification.

11. In apparatus for drying air for use in instruments, a primary refrigerant system, a second refrigerant system in heat exchange relation with said primary refrigerant system whereby secondary refrigerant is cooled, a spray chamber into which secondary refrigerant is introduced by said secondary refrigerant system, a source of compressed air, a precooler in said secondary refrigerant system communicating with said source of compressed air for precooling the compressed air, said precooled compressed air communicating with said spray chamber, and being introduced therein into contact with cooled secondary refrigerant, whereby moisture in said air is removed by freezing.

References Cited in the file of this patent

UNITED STATES PATENTS

| | | |
|---|---|---|
| 2,484,875 | Cooper | Oct. 18, 1949 |
| 2,516,717 | Ogorzaly | July 25, 1950 |
| 2,555,060 | Schuftan | May 29, 1951 |
| 2,794,334 | Peaslee et al. | June 4, 1957 |